Jan. 17, 1928.  J. R. MARTIN  1,656,864
PIPE HOLDER
Filed Jan. 7, 1927  2 Sheets-Sheet 1

INVENTOR.
John R Martin
BY Hardway Tatt
ATTORNEYS.

Jan. 17, 1928.

J. R. MARTIN 1,656,864

PIPE HOLDER

Filed Jan. 7, 1927

INVENTOR:
John R Martin
BY
Hardway Cathey
ATTORNEYS.

Patented Jan. 17, 1928.

1,656,864

UNITED STATES PATENT OFFICE.

JOHN R. MARTIN, OF HOUSTON, TEXAS, ASSIGNOR OF ONE-HALF TO JAMES S. ABERCROMBIE AND ONE-FOURTH TO A. C. (TEX) BAYLESS, BOTH OF HOUSTON, TEXAS.

PIPE HOLDER.

Application filed January 7, 1927. Serial No. 159,736.

This invention relates to new and useful improvements in a pipe holder.

One object of the invention is to provide a holder of the character described adapted to be inserted into the rotary table of a rotary drilling machine around a drill stem, tubing, or other pipe, to hold the same suspended from said table, in a well bore.

Another object of the invention is to provide a pipe holder of the character described embodying a skeleton framework composed of a sectional ringlike support and spaced depending guides, with engaging jaws swung from the support and working between said guides, and adapted to engage the drill stem, tubing, or other pipe, to be held.

A further object of the invention is to provide a holder of the character described, which is formed of sections hinged together so that the sections may be swung open or closed in removing the same from, or applying the same to the pipe.

A further feature of the invention resides in the provision of novel means for manipulating the holder in applying the same to or removing the same from the stem, tubing or pipe to be held.

With the above and other objects in view this invention has particular relation to certain novel features of construction, operation and arrangement of parts, an example of which is given in this specification and illustrated in the accompanying drawings, wherein:—

Figure 1:
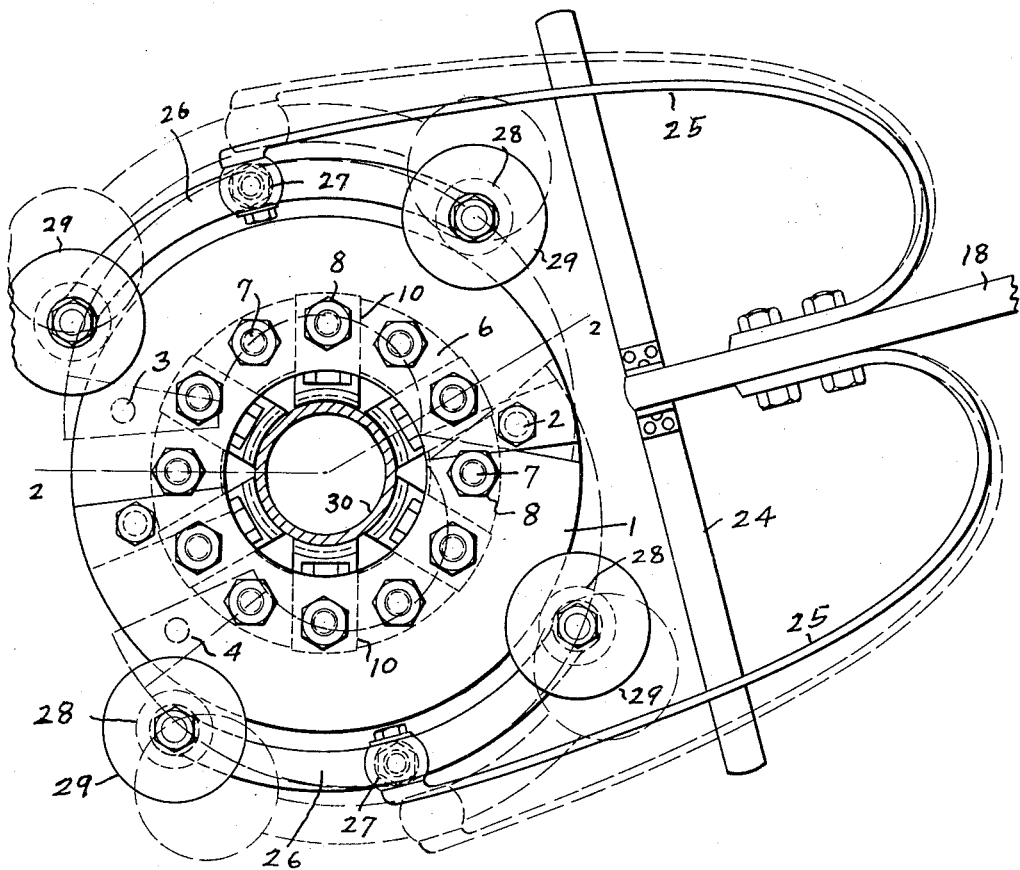
Figure 1 shows a plan view of the pipe holder, showing the means for manipulating the same, partly broken away.
Figure 2:
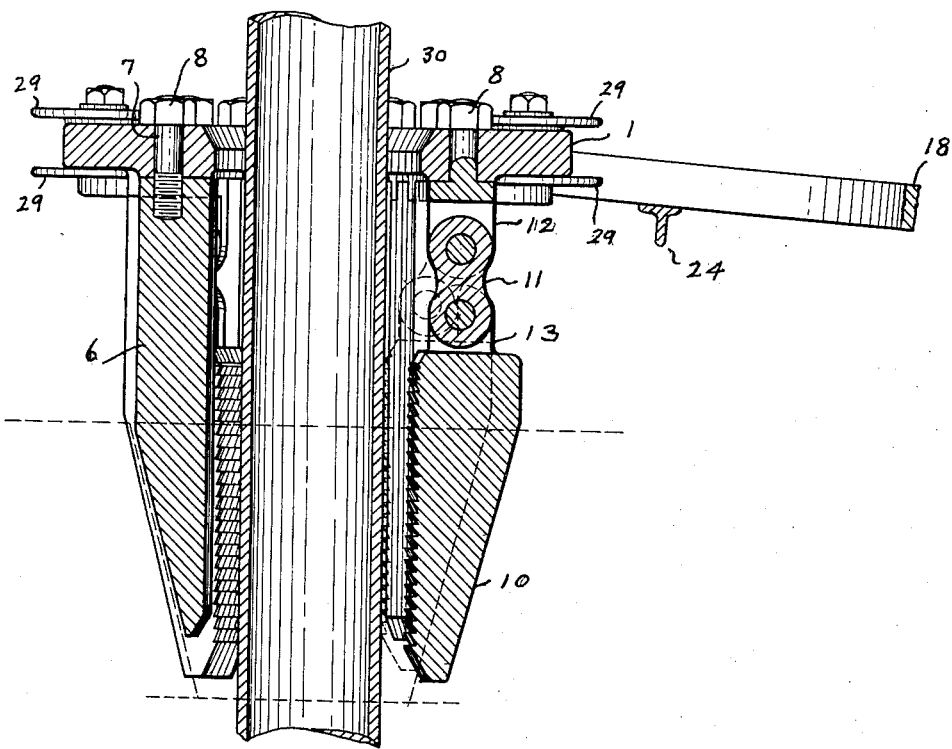
Figure 2 shows a vertical sectional view thereof, taken on the line 2—2 of Figure 1.
Figure 3:
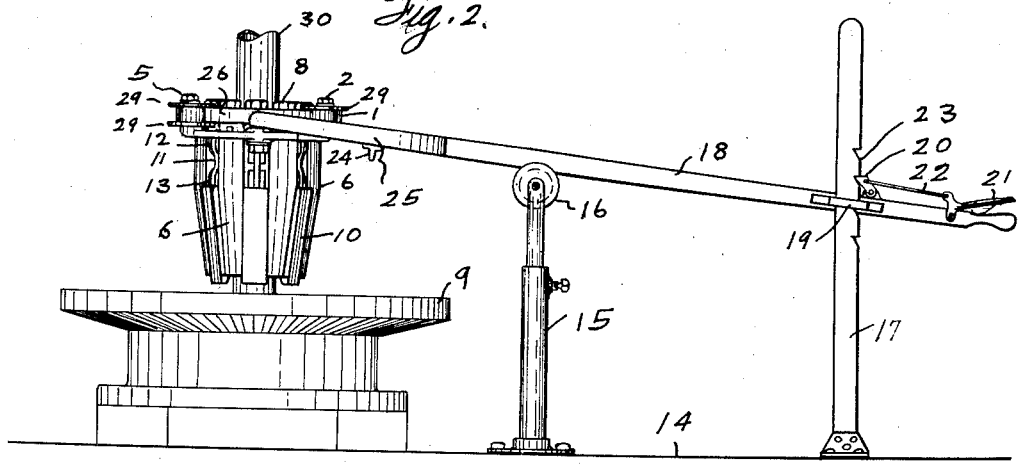
Figure 3 shows a side elevation of the complete device.

Referring now more particularly to the drawings, wherein like numerals of reference designate similar parts, in each of the figures, the numeral 1 designates a ringlike support, preferably composed of two arcuate sections hinged together at one end, the hinged ends of the sections working on the hinge pin 2. The other ends of the support sections are formed to intermesh, said intermeshing ends having the pin holes 3, 4, provided to receive the removable pin 5 by means of which the sections may be secured together around the pipe or tubing.

Depending from each section of the support 1 are the guides 6 substantially triangular in horizontal cross section. These guides are spaced apart to form jaw spaces or bearings between them and the upper end of each guide is reduced and formed into a pin 7 which is fitted through a hole in said support with its upper end threaded to receive the nut 8. The outer sides of the lower ends of the guides are tapered downwardly and inwardly to conform to and fit within the downwardly converging central opening of the rotary table 9, said opening being provided to permit the pipe to pass therethrough in the well known manner.

Between the guides 6 are the pipe engaging jaws 10. These jaws are swung from the support 1 by means of links, as 11, the respective ends of said links being pivotally connected to the lugs 12 which depend from the support 1 and to the lugs 13 which are carried by the upper ends of said jaws and the outer sides of the jaws taper or converge downwardly to fit within said rotary table opening while their inner sides are toothed to engage the pipe to be held. As shown in Figure 1 the jaws 10 have greater radial diameters than the guides 6 so that said guides will not engage the outer wall of the rotary table opening, or seat and prevent the jaws from being forced thereby into engaging relation with the pipe.

Upstanding from the derrick floor 14 there is a vertically adjustable stand 15 whose upper end carries the cross bearing roller 16 and out beyond said stand and on a radial line passing from the axis of the rotary table through said stand, there is a standard 17 fixed to and upstanding from the floor 14. There is a manipulating lever 18 supported on the roller 16 and whose outer end works adjacent the standard 17 and is maintained in working relation therewith by the bracket 19 which is fastened to the lever 18 and surrounds said standard. The outer end of the lever 18 carries a dog 20 operable through the grip lever 21 pivoted to said lever 18 and connected to said dog through the link 22. The standard 17 has a ratchet face 23 with which said dog is adapted to engage.

The inner end of the lever 18 has a cross bar 24 fastened thereto and extending out each way therefrom and also has the pair of flexible arms 25, 25, which rest on said bar and are attached at one end to the lever 18. The other ends of these arms 25 carry the arcuate yokes 26, 26, the free ends of said arms being connected by universal joints 27, 27, to the centers of said yokes. The free ends of each yoke 26 carry the spool shaped roller bearings 28, 28, mounted to rotate on vertical axes and each having the end flanges 29, 29. The arms 25 embrace the holder proper and the bearings 28 are held by said arms in contact with the periphery of the support 1 with the flanges 29 above and below the support.

When the holder is applied around the pipe 30 it may be seated in the rotary table seat by releasing the dog 20 and elevating the outer end of the lever 18.

As the holder is lowered the guides 6 will guide it and the jaws thereof into the downwardly converging rotary seat and said seat will force the jaws 10 in engagement with the pipe 30 and if the rotary be turned, while the holder is in such engaging position the holder and pipe 30 will rotate with it, the support 1 turning within the bearing rollers 28. If it be desired to elevate the holder the outer end of the lever 18 may be lowered until the holder clears said table and the jaws 10 will swing outwardly away from the pipe 30 so that said pipe and its collars may be elevated or lowered, the guides 6 being spaced from the pipe a sufficient distance to permit the collars connecting the pipe sections to pass therethrough and the holder may be held in such elevated position by suitably engaging the dog 20 with the ratchet face 23, in readiness to be again lowered into pipe engaging position.

If it be desired to remove the holder from the pipe the pin 5 may be withdrawn and the holder sections swung apart and the lever 18 lifted to disengage the bracket 19 from the standard 17 and the lever and holder then moved outwardly, said lever working on the roller bearing 16.

The pipe holder has been shown and described in its cooperative relation with a rotary table of a rotary drilling machine. It is to be understood, however, that it may be used in connection with any type of tapering seat employed for the purpose of sustaining pipe tubing in a well bore.

What I claim is:

1. A pipe holder including an annular support, spaced guides rigidly attached thereto and depending therefrom, and radially movable pipe engaging jaws between said guides.

2. A pipe holder including an annular support, spaced guides rigidly attached thereto and depending therefrom, and radially movable pipe engaging jaws between said guides, said jaws being suspended from said support.

3. A pipe holder including an annular support, spaced guides rigidly connected thereto and depending therefrom, radially movable pipe engaging jaws between the guides, the outer sides of said jaws tapering downwardly.

4. A pipe holder including an annular support, spaced guides rigidly connected thereto, and depending therefrom, radially movable pipe engaging jaws between the guides, the outer sides of said jaws tapering downwardly, the outer sides of said guides also tapering downwardly.

5. A pipe holder including an annular support formed of sections hinged together at one end, guides depending therefrom and spaced apart and radially movable pipe engaging jaws between the guides.

6. A pipe holder including an annular support formed of sections hinged together at one end, guides depending therefrom and spaced apart and radially movable pipe engaging jaws between the guides, said jaws being suspended from said support.

7. A pipe holder including an annular support, spaced guides detachably secured to the support and depending therefrom, and radially movable jaws between said guides.

8. A pipe holder including an annular support, spaced guides detachably secured to the support and depending therefrom, and radially movable jaws between said guides, said jaws being swung from said support.

9. A pipe holder including an annular support and radially movable pipe engaging jaws depending therefrom, in combination with a manipulating lever having bearings which embrace said support.

10. A pipe holder including an annular support and radially movable pipe engaging jaws depending therefrom, in combination with a manipulating lever having bearings which embrace said support and between which the support is rotatable.

11. The combination with a pipe holder, of a manipulating lever, bearings carried by said lever, which embrace and are operatively connected with said holder.

12. The combination with a pipe holder having an annular jaw support and pipe engaging jaws carried thereby, of a manipulating lever and spool-like bearings carried by the lever and embracing said holder.

13. The combination with a pipe holder having an annular jaw support and pipe engaging jaws carried thereby, of a manipulating lever and spool-like bearings carried by the lever and embracing said holder, said bearings having end flanges between which the support works.

14. The combination with a pipe holder having an annular jaw support and radially movable jaws carried thereby, of a manipulating lever formed with spaced yieldable arms at one end adapted to embrace the holder, and bearings carried by said arms and formed to receive said support.

15. The combination with a pipe holder having an annular jaw support, and radially movable jaws carried thereby, of a manipulating lever formed with spaced yieldable arms at one end adapted to embrace the holder, and bearings carried by said arms and formed to receive said support, said bearings being rotatable on said arms.

16. The combination with a pipe holder, of a manipulating lever, bearings carried by said lever which embrace and are operatively connected with said holder and a fulcrum on which the lever is adapted to work.

17. A pipe holder including an annular support and radially movable pipe engaging jaws depending therefrom in combination with a manipulating lever having bearings which embrace said support, a fulcrum formed with a roller bearing on which said lever is adapted to work.

In testimony whereof I have signed my name to this specification.

JOHN R. MARTIN.